April 28, 1953 D. LEVINE 2,636,674
COMPUTER FOR NONLINEAR AMPLIFIERS
Filed Feb. 13, 1952 7 Sheets-Sheet 1

INVENTOR.
DANIEL LEVINE
BY Wade Koontz AND
Orlando Z. McCoy
ATTORNEYS

INVENTOR.
DANIEL LEVINE
BY Wade Koontz AND
Orlando Z. Massey
ATTORNEYS

April 28, 1953 D. LEVINE 2,636,674

COMPUTER FOR NONLINEAR AMPLIFIERS

Filed Feb. 13, 1952 7 Sheets-Sheet 3

INVENTOR.
DANIEL LEVINE
BY Wade Koontz AND
Orlando Z. McCoy
ATTORNEYS

April 28, 1953 D. LEVINE 2,636,674

COMPUTER FOR NONLINEAR AMPLIFIERS

Filed Feb. 13, 1952 7 Sheets-Sheet 4

INVENTOR.
DANIEL LEVINE
BY Wade Koontz AND
Orlando X. Mosley
ATTORNEYS

April 28, 1953 D. LEVINE 2,636,674

COMPUTER FOR NONLINEAR AMPLIFIERS

Filed Feb. 13, 1952 7 Sheets-Sheet 5

OPERATING PATH OF A FREQUENCY DOUBLER $I_b = 0.0833[0.5(A+L)+B+C+D+E+F+G+H+I+J+K+Q]$

AND $Ipm_2 = 0.167[0.5(A+C+J+L-E-H)+0.860(B+K-F-G)-Q]$

WHERE CURRENT VALUES ARE ASSOCIATED WITH THE CORRESPONDING LETTERS ON THE $e_c$ AXIS.

INVENTOR.
DANIEL LEVINE
BY Wade Koontz AND
Orlando Z. Malloy
ATTORNEYS.

April 28, 1953 D. LEVINE 2,636,674

COMPUTER FOR NONLINEAR AMPLIFIERS

Filed Feb. 13, 1952 7 Sheets-Sheet 6

OPERATING PATH OF A FREQUENCY TRIPLER $I_b = 0.0833[0.5(A+L)+B+C+D+E+F+G+H+I+J+K+Q]$

AND $I_{pm_3} = 0.167[0.5(A-L)+0.707(B+G+I-D-F-K)-E+H]$

WHERE CURRENT VALUES ARE ASSOCIATED WITH THE CORRESPONING LETTERS ON THE $e_c$ AXIS

INVENTOR.
DANIEL LEVINE
BY Wade Koontz AND Orlando Z. McCoy
ATTORNEYS

OPERATING PATH OF A FREQUENCY QUADRUPLER $I_b = 0.0833\ [0.5\ (A+L)+B+C+D+E+F+G+H+I+J+K+Q]$

AND $I_{pm_4} = 0.167\ [0.5\ (A+B+F+G+K+L-C-E-H-J)-D-I+Q]$

WHERE CURRENT VALUES ARE ASSOCIATED WITH THE CORRESPONDING LETTERS ON THE $e_c$ AXIS.

INVENTOR.
DANIEL LEVINE
BY Wade Koontz AND Orlando M. McCoy
ATTORNEY

Patented Apr. 28, 1953

2,636,674

UNITED STATES PATENT OFFICE 2,636,674

COMPUTER FOR NONLINEAR AMPLIFIERS

Daniel Levine, Dayton, Ohio

Application February 13, 1952, Serial No. 271,413

2 Claims. (Cl. 235—61)

(Granted under Title 35, U. S. Code (1952), sec. 266)

The invention described herein may be manufactured and used by or for the Government for governmental purposes without payment to me of any royalty thereon.

This invention concerns a computer for use in radio work and other applications of oscillatory systems and more particularly to a computer for non-linear amplifiers and the like, and the method of its use described herein.

In the past, determinations concerning amplifiers have been arrived at by separate computations involving the use of mathematical tables, charts, graphs, and related devices that, with the attendant necessary computations, are time consuming and laborious.

The objects of the present invention comprise the provision of a manually operable computer device for minimizing time consuming references and computations as applied to data on nonlinear amplifiers, in designing the stages of a transmitter, in the analysis of frequency multipliers, current harmonics in vacuum tubes, and related operations in other oscillatory systems.

An illustrative operative embodiment of the present invention is shown in the accompanying drawings, wherein:

Figure 1 is a plan view of a computing device that embodies the present invention;

Figure 1*a* shows the polar coordinate system used in expressing the equations of the curves appearing on the face of the computing device;

Figure 1:
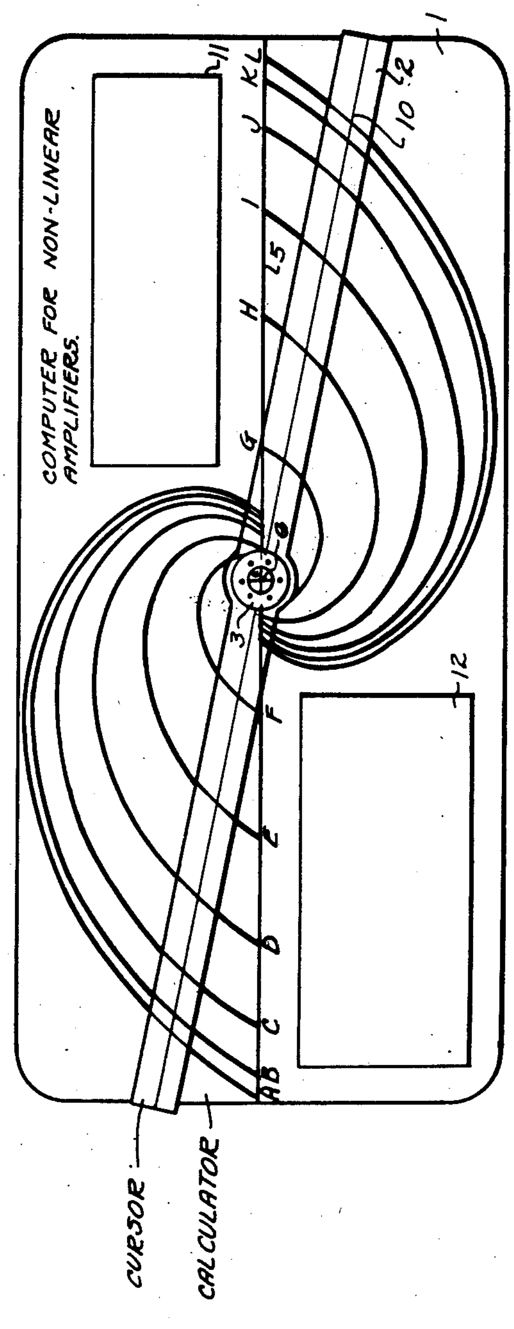
Figure 2:
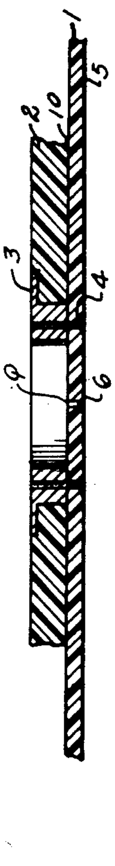
Figure 2 is a sectional view taken at the center of the device shown in Figure 1.

The device shown in Figure 1 of the accompanying drawings comprises a rectangular transparent calculator 1 with a transparent cursor 2 rotatably mounted on a ring 3 secured to the calculator 1 at substantially its center. The cursor 2 is expanded midway between its upper and lower surfaces for being journaled on the hollow metal ring 3 that is secured by screws 4 to the calculator 1. As shown in section in Figure 2 the hollow metal ring 3 is flanged to overlie the radially inner upper surface of the circular expanded portion of the cursor 2. The screws 4 pass through the calculator 1 and thread into the ring 3. A cursor index line 10 extends along the cursor 2 midway between its lateral edges and preferably is engraved in its lower surface. In the use of the device the cursor index line 10 serves as a marker index for taking a series of readings.

A calculator base line 5 extends longitudinally of the calculator 1 midway between its lateral edges through its center Q. Preferably the calculator is apertured at its center Q, at which point the calculator base line 5 preferably is intersected at right angles by a cross hair line 6. The lines 5 and 6 intersect at right angles at the center of the hollow ring 3. The calculator 1 preferably is apertured at its quiescent point Q for sticking a pin, not shown, through the calculator into a graph and then rotating the calculator 1 around the pin, as will be more completely described hereinafter. In use the point Q of the computer is coincident with the quiescent point for an ordinary radio frequency amplifier. For a frequency multiplier, the Q point of the computer is not associated with the quiescent point of the amplifier. The quiescent point is the tube operating point when no signal is applied to the grid of the tube. Both lines 5 and 6 preferably are engraved in the lower surface of the calculator 1 to minimize parallax in bringing coincident lines into registration.

A desired plurality of curves designated illustratively in Figure 1 as curves A to L, inclusive, are engraved preferably in the lower surface of the calculator 1. Curve A is drawn arbitrarily so as to meet line 5 on either side of the computer center Q.

With respect to the curves on the calculator 1, a computing aid having an outside curve that spirals out according to any formulation is satisfactory for the outermost curve designated A on the calculator 1. The additional curves are derived by a multiplication of the A curve by cos K delta theta where K takes on integral values between 1 and $$\frac{180^\circ}{\Delta\theta}$$

The angle theta $\theta$=360 degrees, where $f$ is the frequency of the grid signal voltage in cycles per second and $t$ is time in seconds. The angle $\theta$ is expressed in degrees. All of the other curves are drawn on the basis of curve A as a reference curve. The curves A to F are mirror or reverse images through Q of the curves G to L. Along the line 5, the spaces from Q of the curves on one side of the point Q are related but are not equal to each other.

In an experimental model delta theta was taken as 15° and illustratively may be assumed as 15° in this description. Each division between the computer curves corresponds to $\frac{1}{24}$ of one cycle since $\frac{15}{360}=\frac{1}{24}$. For application to frequency multiplication of 5 or more, or for more accurate results than the application described herein, a smaller value of delta theta should be used.

The experimental model shown in Figure 1 of the drawings was based on curve A being an algebraic-trigonometrical relation such as rho equals $[(2+0.0472\phi)^2 \cos^2 \phi+(1.46+0.0344\phi)^2 \sin^2 \phi]^{1/2}$ and with the other curves B to L inclusive being natural functions of A. The curve A expressed in Cartesian coordinates has the values $$x=\left(2+\frac{8.5\phi}{180}\right)$$

$\cos \phi$ and $y=0.73$ $$\left(2+\frac{8.5\phi}{180}\right)$$

$\sin \phi$ where $\phi$ is a parameter that has values between 0 and 180°, being the angle measured counterclockwise from the line QL in Figure 1.

Along the calculator line 5 through the point Q, the distance from Q to the point B is the product of the distance to point A multiplied by cos 15°, or the distance to B is 0.966A. (In natural functions cos 15°=0.966.) In a similar manner the distance along the line 5 from Q to the point C is cos 30°A or 0.866A; to point D is cos 45° A or 0.707A; to point E is cos 60°A or 0.500A; to point F is cos 75°A or 0.259A; to point Q is cos 90°A or 0.000A; to point G is cos 105°A or minus 0.259A; to point H, is cos 120°A or minus 0.500A; to point I is cos 135°A or minus 0.707A; to point J is cos 150°A or minus 0.866A; to point K is cos 165°A or minus 0.966A; and to point L is cos 180°A or minus A. In the model the unit of measurement adopted was dimensioned to handle physically plate voltage swings that covered from 4 to 21 inches on the scale employed. The calculator of the experimental model was 22 by 10½ inches.

The calculator 1 bears the title "Computer for Non-Linear Amplifiers" above a chart 11, that illustratively is placed at the upper right hand side of the face of the calculator. A second chart 12 illustratively is positioned on the lower left hand side of the face of the calculator.

The calculator chart 11 pertains to plate current $I_b$, fundamental plate current $I_{pm1}$ and a desired number of harmonics of the fundamental or $I_{pmn}$ and reads:

$$I_b=0.0833\,[0.5(A+L)+B+C+D+E+F+G+H+I+J+K+Q]$$
$$I_{pm1}=0.167\,[0.5(A+E-H-L)+0.966(B-K)+0.866\,(C-J)+0.707\,(D-I)+0.259(F-G)]$$
$$I_{pm2}=0.167\,[0.5(A+C+J+L-E-H)+0.866(B+K-F-G)-Q]$$
$$I_{pm3}=0.167\,[0.5(A-L)+0.707(B+G+I-D-F-K)-E+H]$$
$$I_{pm4}=0.167\,[0.5(A+B+F+G+K+L-C-E-H-J)-D-I+Q].$$

The calculator chart 12 pertains to instructions for the use of the instrument in determining tube operating values and reads:

"RF amplifier: Place Q at ($E_b$, $E_c$) and curve A at ($E_b-E_{pm1}$, $E_c+E_{gm}$).

Read current value associated with each point lying under cursor.

Substitute into equations for $I_b$ and $I_{pm1}$.

Frequency multiplier:

(1) Along $e_c$ axis, place Q at $E_c$ and curve A at $E_c+E_{gm}$. Note all grid voltages associated with points lying under cursor.

(2) Along the $e_b$ axis, place Q at $E_b$ and curve A at $E_b-E_{pmn}$. Note plate voltages associated with following points under cursor:

Doubler: ACEQHJL
Tripler: ADQIL
Quadrupler: AEHL (3) With each grid voltage in top line, pair corresponding primed plate voltage indicated below it in following table:

| $e_c$ | A | B | C | D | E | F | Q | G | H | I | J | K | L |
|---|---|---|---|---|---|---|---|---|---|---|---|---|---|
| $e_b$ doubler | A′ | C′ | E′ | Q′ | H′ | J′ | L′ | J′ | H′ | Q′ | E′ | C′ | A′ |
| $e_b$ tripler | A′ | D′ | Q′ | I′ | L′ | I′ | Q′ | D′ | A′ | D′ | Q′ | I′ | L′ |
| $e_b$ Quadrupler | A′ | E′ | H′ | L′ | H′ | E′ | A′ | E′ | H′ | L′ | H′ | E′ | A′ |

(4) Read current at each point, substitute into equations for $I_b$ and $I_{pmn}$ using grid letter to identify current."

The computer shown in Figure 1 of the drawings is based on the Fourier analysis of a current pulse in an amplifier stage during one cycle of grid voltage, which yields:

$$I_b=\frac{1}{2\pi}\int_0^{2\pi} i_b dt=\frac{1}{\pi}\int_0^{\pi} i_b dt \doteq \frac{1}{12}[\tfrac{1}{2}(A+L)+B+C+D+E+F+G+H+I+J+K+Q]$$

and $$I_{pmn}=\frac{1}{\pi}\int_0^{2\pi} i_b \cos n\theta d\theta=\frac{2}{\pi}\int_0^{\pi} i_b \cos n\theta d\theta \doteq \frac{1}{6}\Big\{\frac{1}{2}[A+(-1)^n L]+[B+(-1)^n K]\cos n\,15°+[C+(-1)^n J]\cos n\,30°+[D+(-1)^n I]\cos n\,45°+[E+(-1)^n H]\cos n\,60°+[F+(-1)^n G]\cos n\,75°+Q\cos n\,90°$$

where the integrals are evaluated graphically using the trapezoidal rule. In the above equations $I_b$ is plate current; $I_{pm1}$ is fundamental plate current; and the letter $n$ is a general number designating a particular harmonic of the fundamental.

The explicit expressions for $n=1, 2, 3$ and 4 are given in chart 11 on the face of the computer. Rapid selection of the current values is possible by the use of the computing device shown in Figure 1 when used with the vacuum tube constant current curves illustrated by curves 13 to 17 inclusive, in Figure 3.

Figure 5:
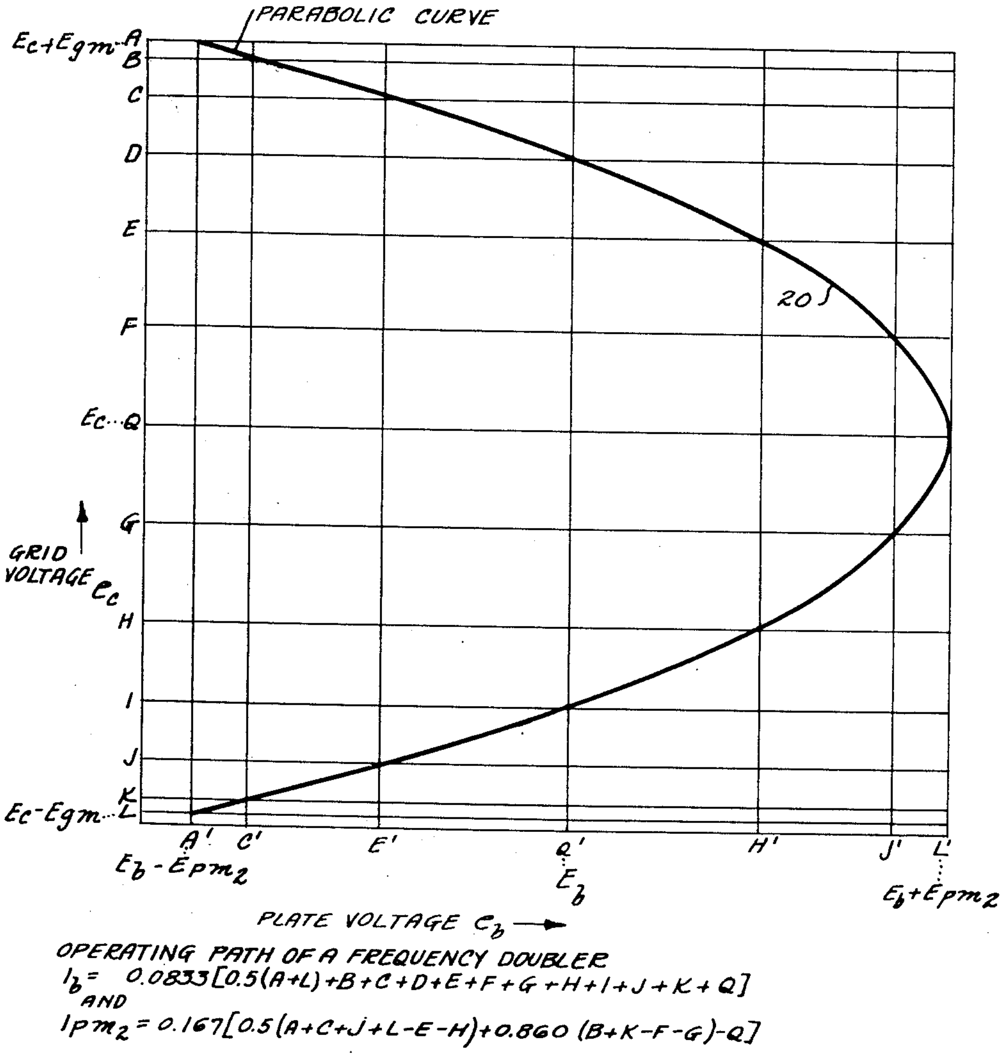
Figure 5 is a graph of an operating path of a frequency doubler as obtained with the device shown in Figure 1.
Figure 6:
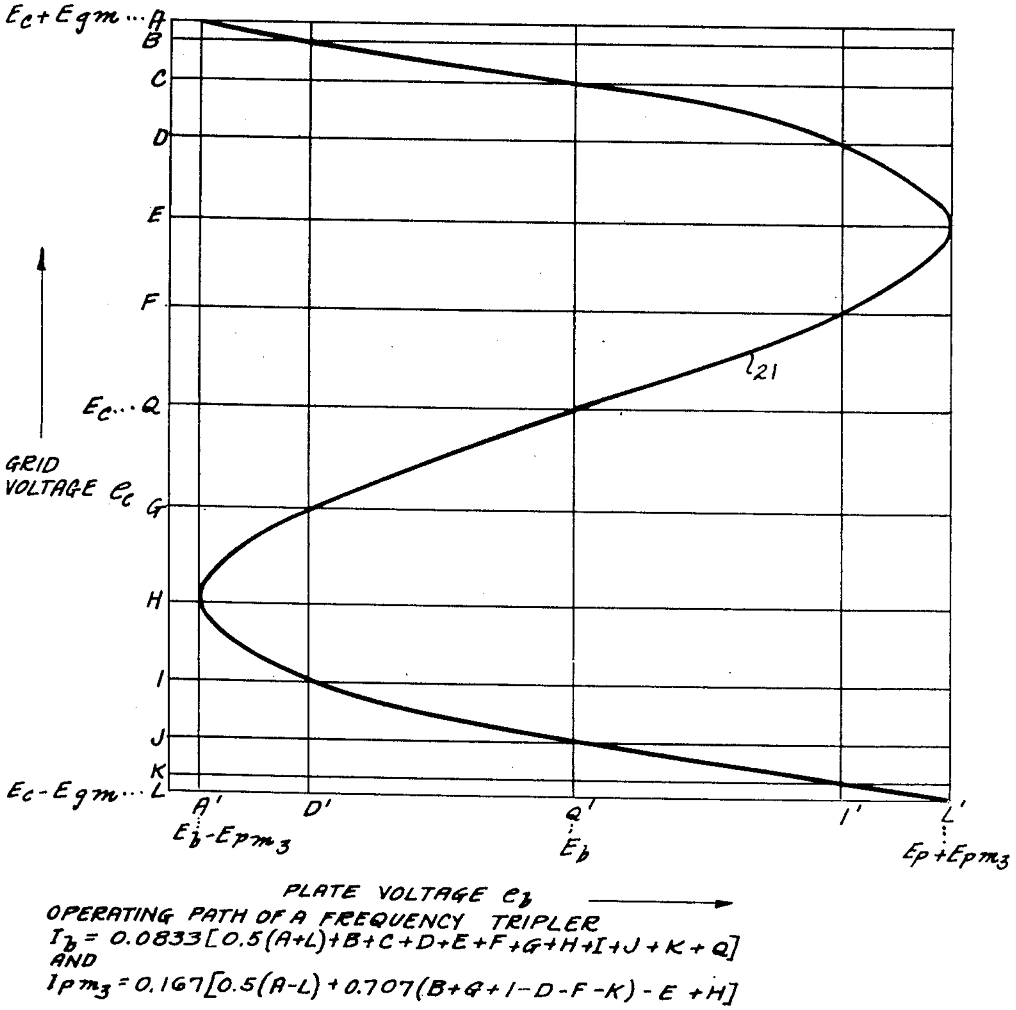
Figure 6 is a graph of an operating path of a frequency tripler.
Figure 7:
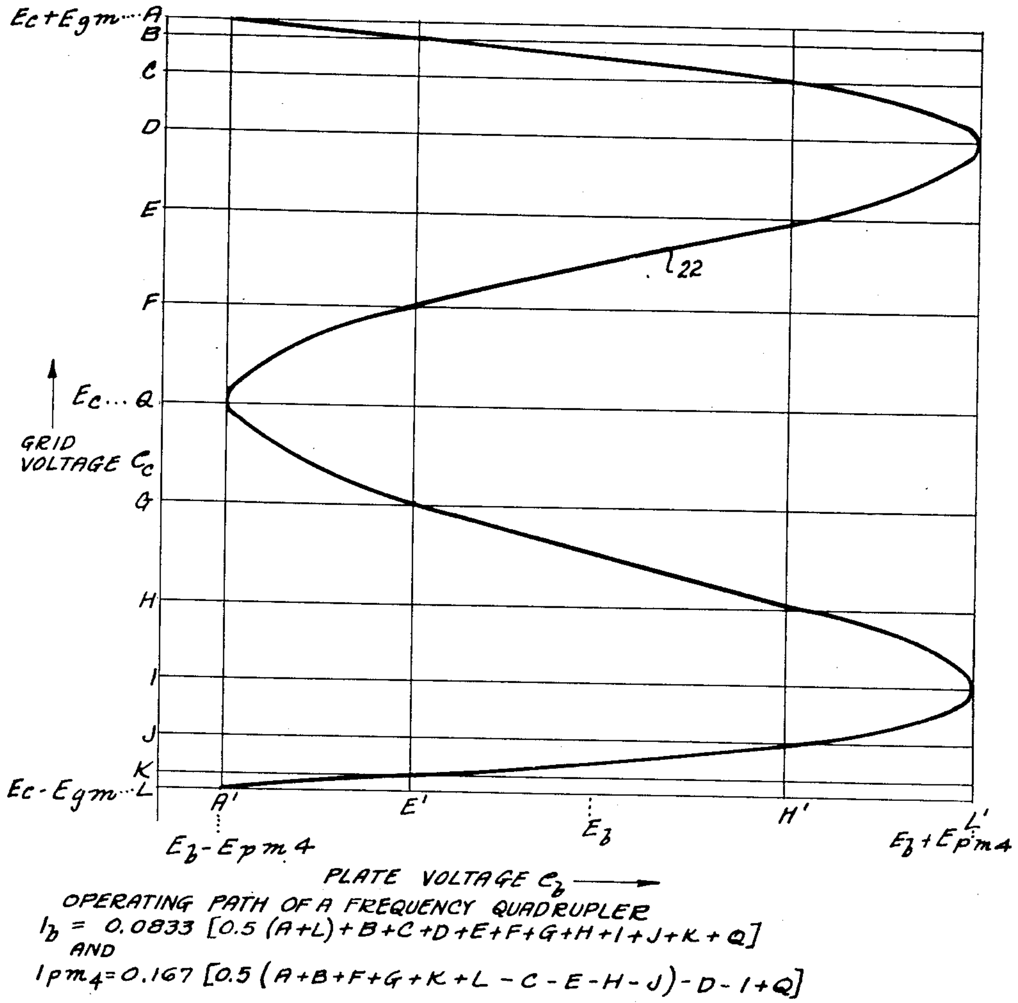

Any radially straight line from the point Q intersects the curves A through L, inclusive, according to a law derived from the Fourier analysis presented herein. Illustrative graphs, curves and the like in a constant current plane as obtained with the device in Figure 1, are shown in Figures 5 to 7 inclusive in the drawings. As used together, the component and the graphs conform practically with each other in size. Rapid selection of current values is possible by the use of the computing device with the graph curves shown in Figure 3. The vacuum tube constant current curves in Figure 3 are plotted in the plate voltage $e_b$-grid voltage $e_c$ plane.

With the vacuum tube operating path and the appropriate grid and plate current components known, the latter having been found by Fourier analysis, the power dissipation of the grid and plate elements of the vacuum tube can be determined by the use of the device disclosed herein. Furthermore, the input power from the signal generator and the output power to the next stage of an amplifier or transmitter also can be determined. With this information, an engineer is able to decide whether the operating parameters selected for the amplifier are satisfactory for a particular application. In circuit design, power is important and current alone has little meaning. The device in the present invention applies in general where an electric input is sinusoidal and of constant frequency. The graphical part of the device in general serves to find frequency components in the output.

The device that is disclosed herein serves to determine the D. C. component of the current in the plate circuit of a radio frequency amplifier, and the first harmonic or fundamental component of the current at the input radio frequency. In finding the direct current component of current using the graph in Figure 3, on the ordinate $E_c$ is the D. C. grid bias voltage, and on the abscissa $E_b$ is the D. C. plate voltage. The radio frequency amplifier has an operating curve which is a straight line in the plate-grid voltage plane. This is shown as follows:

$$e_c = E_c + E_{gm} \cos \theta$$
$$e_b = E_b - E_{pm} \cos \theta$$

Elimination of $\cos \theta$ yields $$e_b = -\frac{E_{pm}}{E_{gm}} e_c + E_b + \frac{E_{pm} E_c}{E_{gm}}$$

which is a straight line in the $e_b$, $e_c$ plane. In the above equations as well as in the Figure 3 graph, $E_{gm}$ is the amplitude of the radio frequency signal voltage on the grid; $E_b$ is the D. C. plate voltage; and $E_{pmn}$ is the amplitude of the "$n$"th harmonic of the radio frequency plate voltage so that the notation may be applied to an ordinary amplifier or to a frequency multiplier.

Figure 3A:
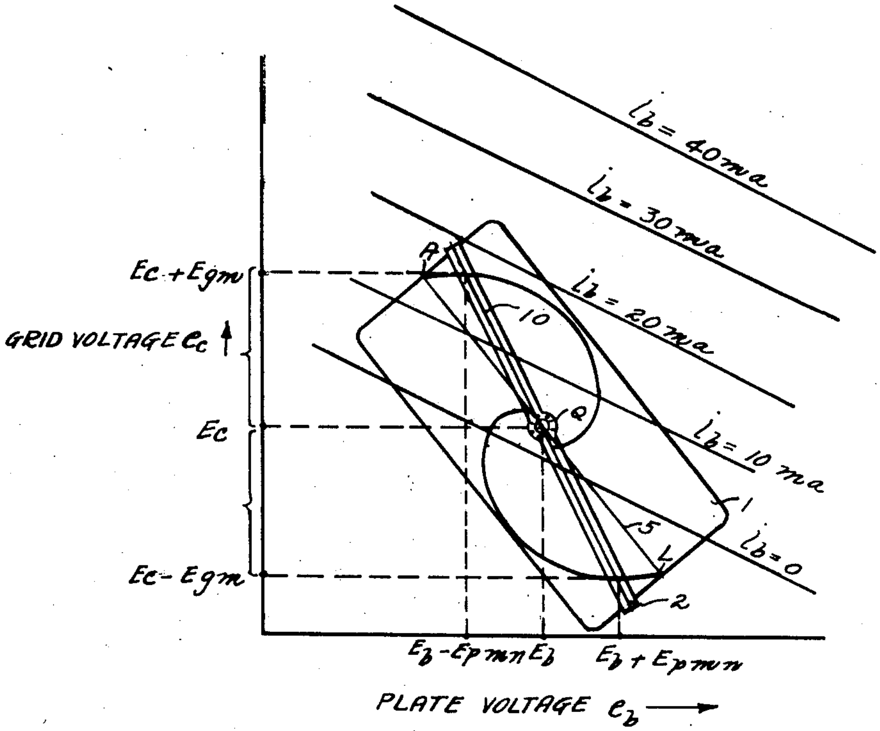
Figure 3 is a plurality of constant current curves in the plate voltage ($e_b$) grid voltage ($e_c$) plane to which the device in Fig. 1 is shown applied in Figs. 3*a*, 3*b* and 3*c* with the $i_b$ lines spread in Fig. 3*a* for clarity.
Figure 7A:
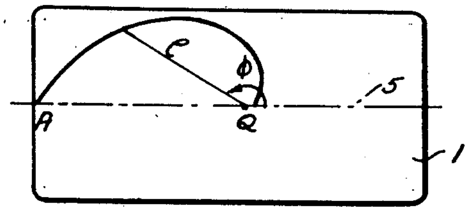
Figure 7 is a graph of an operating path of a frequency quadrupler.
Figure 3:
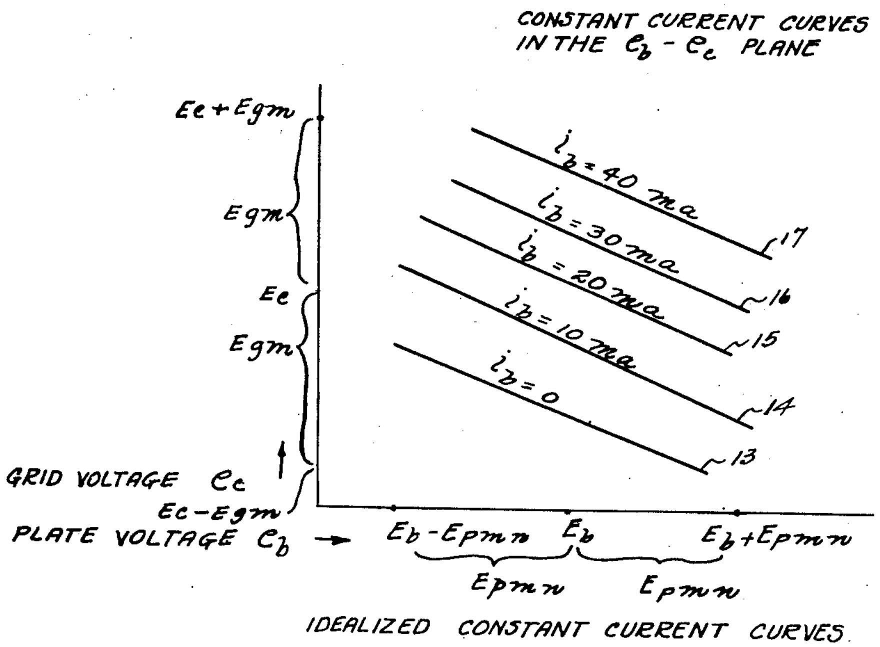

As applied to Figures 3 and 3*a* on cross section graph paper, the calculator 1 is placed on the graph with its center point Q at the point in the $E_b$, $E_c$ plane given by ($E_b$, $E_c$). A pin, not shown, is then inserted in the aperture at the point Q of the calculator 1 to serve as center of rotation. The calculator 1 is then rotated around its center point Q to bring the curve A incident with the projected point $E_b - E_{pm1}$, $E_c + E_{gm}$, where $E_b - E_{pm1}$ is plate voltage projected from the abscissa and $E_c + E_{gm}$ is grid voltage projected from the ordinate. The cursor 2 is then moved until its index line 10 is bought into registration with the latter point ($E_b - E_{pm1}$, $E_c + E_{gm}$). Readings of the current values are then taken from the graph at all points along the cursor index line 10 at its intersections with the curve lines A to L, inclusive, and also the point Q. The current values so obtained are then substituted in the right hand side of the first equation in chart 11 as direct component of the plate current $I_b$, and the value is computed.

Figure 4:
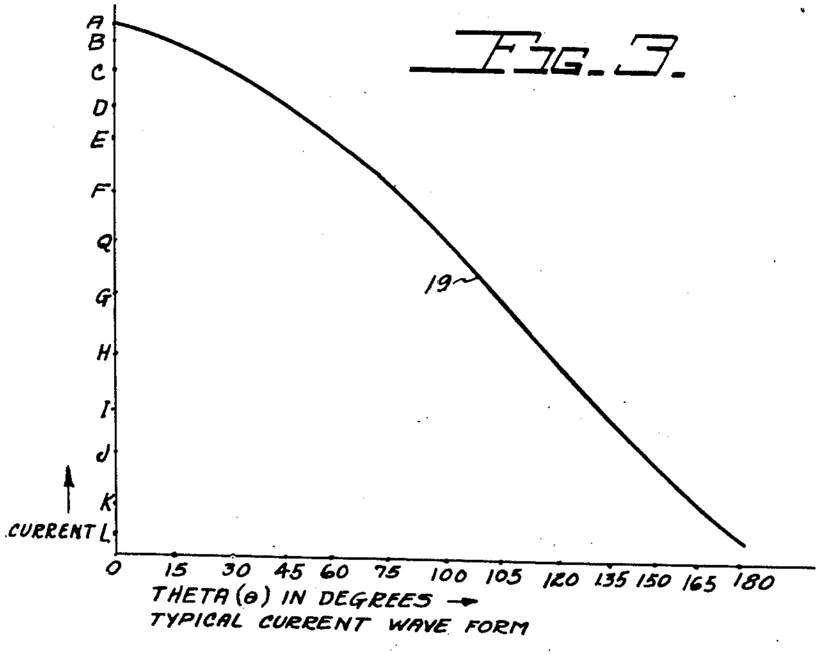
Figure 4 is a graph of a representative current wave plotted against angular current coordinates.

In a similar manner, by substituting in the second equation of chart 11 the current values read from Figure 3 and computing, the fundamental plate current $I_{pm1}$ is determined. The curve in Figure 4 demonstrates the current values so obtained with current plotted against the electrical angle $\theta$.

A frequency doubler has an operating curve which is a portion of a parabola in the grid voltage $e_c$-plate voltage $e_b$ plane. This is proven as follows:

The time varying component of grid voltage, $e_g$, is given by $e_g = E_{gm} \cos \theta$ wherein $\theta$ is the electrical angle of phase displacement where the sine curve of the grid voltage $e_g$ is lagged by the plate voltage $e_p$ by 180° in time. Then, $$ep = -E_{pm2} \cos 2\theta = -E_{pm2}(\cos^2 \theta - \sin^2 \theta) \text{ so that—}$$

$$\frac{e_p}{E_{pm2}} - 2\left(\frac{e_g}{E_{gm}}\right)^2 = -\cos^2 \theta - \sin^2 \theta = -$$

$$1 \text{ or } e_p = E_{pm2}\left[1 - 2\left(\frac{e_g}{E_{gm}}\right)2\right],$$

which is a parabola in the $e_b - e_c$ plane. Several representative values are listed below:

| | $e_b$ | Curve | $e_c$ | Curve |
|---|---|---|---|---|
| 0 | $E_b - E_{pm2}$ | A | $E_c + E_{gm}$ | A |
| 15 | $E_b - 0.866E_{pm2}$ | C | $E_c + 0.966E_{gm}$ | B |
| 30 | $E_b - 0.5E_{pm2}$ | E | $E_c + 0.866E_{gm}$ | C |
| 45 | $E_b$ | Q | $E_c + 0.707E_{gm}$ | D |
| 60 | $E_b + 0.5E_{pm2}$ | H | $E_c + 0.5E_{gm}$ | E |
| 75 | $E_b + 0.866E_{pm2}$ | J | $E_c + 0.259E_{gm}$ | F |
| 90 | $E_b + E_{pm2}$ | L | $E_c$ | Q |

The operating path of a frequency doubler is shown as a parabolic curve 20 in Figure 5 of the drawings. For frequency doubler analysis reference is made to the calculator chart 12, step one. In step one, the center point Q of the calculator 1 is placed at the D. C. grid voltage $E_c$ on the ordinate of the graph and anchored for rotation by placing a pin through the calculator point Q and into the graph paper.

The computer 1 is then rotated about the pin. The computer 1 is rotated until the curve A crosses the ordinate axis at the maximum instantaneous grid voltage $E_c + E_{gm}$. The cursor index line 10 is then placed along the ordinate of the graph as in Figure 3*c* and the values are read and recorded. From these data the curve in Fig. 5 is drawn.

Of the recordings, the least grid voltage is the grid bias minus the amplitude of the signal voltage and the maximum grid voltage is the grid bias plus the amplitude of the signal voltage. This concludes the first step of the calculator chart 12 in taking readings on the operating path of the frequency doubler curve 20 shown in Figure 5. The Q point of the computer is only coincident with the quiescent point for an ordinary radio frequency amplifier. For a frequency multiplier the Q point of the computer is not associated with quiescent point of the amplifier.

Figure 3B:
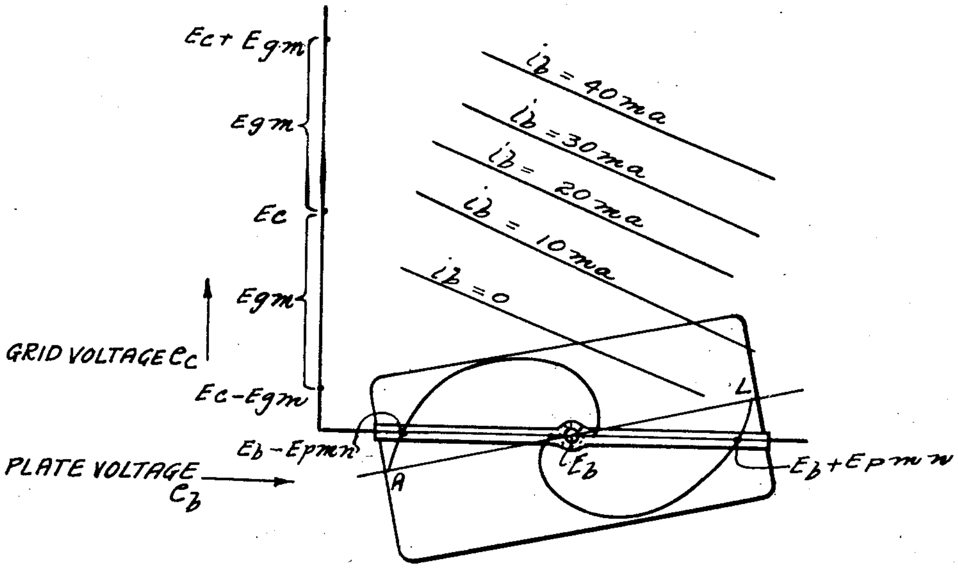

In the second step of the calculator chart 12, the point Q of the calculator 1 is placed on the graph point Q' of the direct component plate voltage $E_b$ on the abscissa of Figure 5. The computer 1 is then rotated around the point Q′ so that the A curve crosses the abscissa at the minimum instantaneous plate voltage $E_b-E_{pm2}$. The cursor index line 10 is then brought into registration with the abscissa of the graph as in Figure 3b. Readings in volts are then made of the points along the cursor index line 10 at its intersections with every other curve (or every second curve) on the calculator 1, or the curves indicated by the letters A, C, E, Q, H, J, and L.

This procedure provides one set of point values of grid voltages and another set of plate voltages which, when properly paired in step three, yield points which lie on the operating path of the vacuum tube, which path is shown as the parabolic curve 20 in Figure 5 of the drawings.

In Figure 5, the letters A, C, E, Q, H, J and L are primed along the abscissa to distinguish from corresponding letters along the ordinate. In actual practice, no confusion arises from these letters being unprimed. The priming of these letters is done for convenience in pairing the values in the calculator chart 12, step 3.

In the third step these values of grid and plate voltages are paired to get points along the tube operating path 20 in a constant current plane and as appear in step 3 for the frequency multiplier section of the calculator chart 12. The plate and grid voltage values are paired as follows:

| | | | | | | | | | | | | | |
|---|---|---|---|---|---|---|---|---|---|---|---|---|---|
| Plate voltage, $e_b$ | A′ | C′ | E′ | Q′ | H′ | J′ | L′ | J′ | H′ | Q′ | E′ | C′ | A′ |
| Grid voltage, $e_c$ | A | B | C | D | E | F | Q | G | H | I | J | K | L |

At each of the points in the constant current plane, Figure 3, the plate current is read and is identified by the corresponding letter along the ordinate. These current values are substituted in the equation in chart 11 for the direct current component of the plate current $I_b$ as obtained in the Fourier analysis, as described previously.

In a similar manner computations are made for the second harmonic component of the plate current $I_{pm2}$ by substituting the determined current values in the Fourier analysis equation for $I_{pm2}$.

The frequency tripler has an operating curve which is a portion of a cubic curve in the plate-grid voltage plane. This is proven as follows:

$$e_g=E_{gm}\cos\theta$$

$$e_p=E_{pm3}\cos 3\theta=-E_{pm3}[-3\cos\theta+4\cos^3\theta]$$

$$=E_{pm3}\left[\frac{3}{E_{gm}}e_g-\frac{4}{E^3_{gm}}e_g^3\right]$$

which is a cubic curve in the $e_b-e_c$ plane. Several representative points are listed below:

| $\theta$ | $e_b$ | Curve | $e_c$ | Curve |
|---|---|---|---|---|
| 0 | $E_b-E_{pm3}$ | A | $E_c+E_{gm}$ | A |
| 15 | $E_b-0.707E_{pm3}$ | D | $E_c+0.966E_{gm}$ | B |
| 30 | $E_b$ | Q | $E_c+0.866E_{gm}$ | C |
| 45 | $E_b+0.707E_{pm3}$ | I | $E_c+0.707E_{gm}$ | D |
| 60 | $E_b+E_{pm3}$ | L | $E_c+0.5E_{gm}$ | E |

The operating path of the frequency tripler is represented by the curve 21 in Figure 6 of the accompanying drawings. Determinations on the operating path of the frequency tripler of Figure 6 also may be accomplished in 3 steps.

Figure 3C:
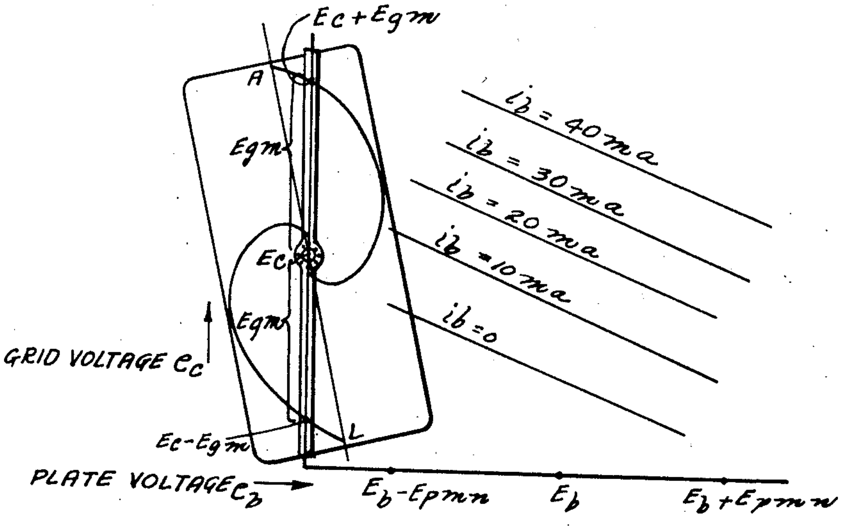

In the first step of the frequency tripler analysis, the calculator is journaled on a pin at its central point Q at the direct component grid voltage $E_c$ on the ordinate of the graph in Figure 3c. The computer is then rotated around its point Q so that the curve A crosses the ordinate axis at the maximum grid voltage, $E_c+g_m$. The cursor index line 10 is then positioned along the ordinate. The voltages along the ordinate at its incidence with each of the curves A to L, inclusive, and Q, are then taken as grid voltages, as in the frequency doubler analysis.

In the second step, the calculator center point Q is placed on the graph point Q′ of the D. C. plate voltage $E_b$ on the abscissa of Figure 3b. The computer 1 is then rotated around its point Q and the graph abscissa point Q′ until the computer A curve crosses the abscissa at the minimum instantaneous plate voltage, $E_b-E_{pm3}$. The cursor index line 10 is then brought into registration with the abscissa of Figure 6 and the points read along the index line 10 at every third curve, or the curves lettered A, D, Q, I and L.

This provides a set of point values of grid voltages and of plate voltages which, when properly paired in the third step, yields points which lie on the vacuum tube operating path represented by the curve 21 of Figure 6.

In Figure 6, the letters A, D, Q, I and L are primed along the abscissa to distinguish from corresponding letters along the ordinate for purposes of distinction herein, although no confusion arises from their unprimed use in actual practice.

In the third step the recorded values of grid and plate voltages are paired to get points along the tube operating path 21 and as appear in the third step for the frequency multiplier section of chart 12 on the calculator 1. At each of the points in the constant current plane, the plate current is read by interpolating in the curves of Figure 3 and is identified by the corresponding letter along the ordinate. These current values are substituted in the equation in chart 11 of the direct current component of the plate current, $I_b$. In a similar manner the third harmonic plate current $I_{pm3}$ is determined.

For the frequency quadrupler curve 22 shown in Figure 7, the values of the grid potential and of the plate potential are determined from the following equation.

The frequency quadrupler has an operating curve 22 in Figure 7, which is a portion of a fourth degree curve in the plate-grid voltage plane. This is proven as follows:

$$E_g=E_{gm}\cos\theta$$

$$e_p=-E_{pm4}\cos 4\theta$$

$$=-E_{pm4}[8\cos^4\theta-8\cos^2\theta+1]$$

$$=-E_{pm4}\left[8\left(\frac{e_g}{E_{gm}}\right)^4-8\left(\frac{e_g}{E_{gm}}\right)^2+1\right]$$

Several points are:

| $\theta$ | $e_b$ | Curve | $e_c$ | Curve |
|---|---|---|---|---|
| 0 | $E_b-E_{pm4}$ | A | $E_c+E_{gm}$ | A |
| 15 | $E_b-0.5E_{pm4}$ | E | $E_c+0.966E_{gm}$ | B |
| 30 | $E_b+0.5E_{pm4}$ | H | $E_c+0.866E_{gm}$ | C |
| 45 | $E_b+E_{pm4}$ | L | $E_c+0.707E_{gm}$ | D |

In the frequency quadrupler analysis first step, the apertured calculator point Q at the center of the calculator 1 is placed at the D. C. grid voltage $E_c$ graph point Q on the ordinate in the graph of Figure 3c. The computer 1 is rotated about its apertured point Q so that its curve A crosses the ordinate axis at the maximum instantaneous grid voltage, $E_c+E_{gm}$. The index line 10 of the cursor 2 is then brought into registration with the ordinate of the graph. The voltage along the ordinate at the incidence of the cursor index line 10 with each of the curves A to L, inclusive, and Q, are read. Each reading is a grid voltage to be used in the process.

In the second step, the calculator apertured point Q at the center of the calculator 1 is placed at the graph point Q′ of the D. C. plate voltage $E^b$ on the abscissa in the graph of Figure 3b. The calculator 1 is then rotated so that its A curve crosses the abscissa at the minimum instantaneous plate voltage, $E_b-E_{pm4}$. The cursor index line 10 is then brought into registration with the graph abscissa. Readings are then noted along the cursor index line 10 at its intersection with every fourth curve on the calculator 1, or the curves A, E, H, and L. This provides a set of point values of grid voltages and of plate voltages which, when properly paired, yield points which lie on the frequency quadrupler tube operating path 22 in Figure 7 of the vacuum tube being analyzed.

In the third step of frequency quadrupler analysis by the graph in Figure 7, the letters A, E, H and L are primed along the abscissa for convenience in pairing the values in the chart 12. These values of grid and plate voltage are then paired to get points along the frequency quadrupler tube operating path 22 in Figure 7, as in step 3 of the frequency multiplier section of chart 12 on the computer 1. At each of the points in the constant current plane of Figure 3 the plate current is read and identified by the corresponding letters along the ordinate. These current values are then substituted in the equation of chart 11 of the direct current component of the plate current, $I_b$. In a similar manner, the fourth harmonic of plate current $I_{pm4}$ is determined by substituting in the equation for $I_{pm4}$ the values taken from the chart 11.

A trapezoidal rule was employed in the graphical integration that was used in obtaining the equations for the computer. The graphical integration may be accomplished also by other suitable methods, such as by the rectangular rule, by Simpson's method, or the like.

To perform similar analysis for frequency multipliers which involve multiplication by 5 or more, a similar calculator with additional curves may be employed. The design or such a calculator merely requires that delta theta in the graphical integration of the Fourier analysis be taken as 5 or 10 degrees, rather than as 15 degrees, as described in detail in this application. The interval selected determines the accuracy of the result.

Since electrical systems frequently have mechanical analogues, it will be apparent that the device disclosed herein is applicable in general to devices that have either a sinusoidal input or a sinusoidal output.

The initial function of the present device is:

(1) To locate points which lie on the operating curve; and (2) To aid in selecting those points on the operating curve at which readings are taken to compute the Fourier components.

It is to be understood that the computer and the method of its application for the making of computations in connection with amplifiers, frequency multipliers, and vacuum tubes in general that are disclosed and described herein have been submitted for the purposes of illustrating and explaining an operative embodiment of the present invention and that similarly operable modifications therefor may be substituted therefor without departing from the scope of the present invention.

What I claim is:

1. A computer, comprising a transparent calculator bearing a substantially straight base line directed through an aperture in said calculator, a curve on said calculator, and a transparent cursor rotatably mounted on said calculator and bearing a substantially straight index line directed through the calculator aperture for all positions of the cursor with respect to said calculator.

2. A computer, comprising a calculator bearing a base line intersected by a cross line at an aperture thereof to indicate a central Q point, a plurality of curves on said calculator intersecting the base line of said calculator in pairs equidistant from the Q point, and a cursor journaled on said calculator and bearing an index line directed through the central point of said calculator and rotatable therearound.

DANIEL LEVINE.

References Cited in the file of this patent

UNITED STATES PATENTS

| Number | Name | Date |
|---|---|---|
| 1,074,439 | Kincaid | Sept. 30, 1913 |
| 1,404,450 | Lofland | Jan. 24, 1922 |
| 2,222,925 | West | Nov. 26, 1940 |

OTHER REFERENCES

Figures 2–11 on page 20 of "Electron Tube Circuits," by Samuel Seely; published by McGraw-Hill Book Co. of New York in 1950; First Edition.